United States Patent
Kirby et al.

(10) Patent No.: US 9,407,327 B2
(45) Date of Patent: Aug. 2, 2016

(54) WIRELESS POWER FOR CHARGEABLE AND CHARGING DEVICES

(75) Inventors: Miles A. Kirby, San Diego, CA (US); Matthew S. Grob, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 12/695,911

(22) Filed: Jan. 28, 2010

(65) Prior Publication Data

US 2010/0225272 A1  Sep. 9, 2010

Related U.S. Application Data

(60) Provisional application No. 61/152,359, filed on Feb. 13, 2009.

(51) Int. Cl.
*H02J 7/00* (2006.01)
*H04B 5/00* (2006.01)
*H02J 7/02* (2016.01)

(52) U.S. Cl.
CPC . *H04B 5/00* (2013.01); *H02J 7/025* (2013.01); *H02J 50/10* (2016.02); *H02J 50/12* (2016.02); *H04B 5/0031* (2013.01); *H04B 5/0037* (2013.01)

(58) Field of Classification Search
CPC ........... H02J 7/025; H02J 50/10; H02J 50/12; H04B 5/00; H04B 5/0031; H04B 5/0037
USPC ........................................................ 320/108
See application file for complete search history.

(56) References Cited

U.S. PATENT DOCUMENTS

| | | | | |
|---|---|---|---|---|
| 7,511,452 | B2* | 3/2009 | Bersenev | 320/106 |
| 8,193,764 | B2* | 6/2012 | Jakubowski | 320/108 |
| 2005/0127869 | A1* | 6/2005 | Calhoon et al. | 320/108 |
| 2005/0181823 | A1* | 8/2005 | Haartsen | 455/553.1 |
| 2006/0113955 | A1* | 6/2006 | Nunally | 320/108 |
| 2007/0090790 | A1* | 4/2007 | Hui | 320/108 |
| 2007/0274373 | A1* | 11/2007 | Cornwall et al. | 375/141 |
| 2007/0278998 | A1 | 12/2007 | Koyama | |
| 2008/0054638 | A1* | 3/2008 | Greene et al. | 290/1 R |
| 2008/0162029 | A1 | 7/2008 | Itoh | |
| 2009/0033280 | A1* | 2/2009 | Choi et al. | 320/108 |
| 2009/0058361 | A1* | 3/2009 | John | 320/128 |
| 2009/0072782 | A1* | 3/2009 | Randall | G06F 1/1616 320/107 |

(Continued)

FOREIGN PATENT DOCUMENTS

| | | |
|---|---|---|
| CN | 1918852 A | 2/2007 |
| DE | WO2008125072 | * 10/2008 |

(Continued)

OTHER PUBLICATIONS

English Machine Translation for WO/2008/125072 (13 Pages).*

(Continued)

*Primary Examiner* — Nathaniel Pelton
(74) *Attorney, Agent, or Firm* — Knobbe, Martens, Olson & Bear LLP

(57) ABSTRACT

Exemplary embodiments are directed to wireless power. A method may comprise detecting one or more transmit elements positioned within an associated charging region. The method may further comprise selecting at least one transmit element of the detected one or more transmit elements to receive wireless power therefrom to enable for optimal charging of a charging device.

32 Claims, 13 Drawing Sheets

(56) References Cited

U.S. PATENT DOCUMENTS

| | | | |
|---|---|---|---|
| 2009/0096413 A1* | 4/2009 | Partovi et al. | 320/108 |
| 2009/0106567 A1* | 4/2009 | Baarman | 713/300 |
| 2009/0127937 A1* | 5/2009 | Widmer et al. | 307/149 |
| 2009/0153098 A1* | 6/2009 | Toya | H02J 7/025 320/108 |
| 2009/0174364 A1* | 7/2009 | Onishi et al. | 320/108 |
| 2009/0284369 A1 | 11/2009 | Toncich et al. | |
| 2009/0286475 A1 | 11/2009 | Toncich et al. | |
| 2009/0286476 A1 | 11/2009 | Toncich et al. | |
| 2010/0219796 A1* | 9/2010 | Kallmyer | H02J 7/025 320/153 |
| 2010/0328044 A1* | 12/2010 | Waffenschmidt | H02J 7/025 340/10.4 |
| 2011/0133691 A1* | 6/2011 | Hautanen | 320/108 |
| 2011/0285210 A1* | 11/2011 | Lemmens et al. | 307/104 |

FOREIGN PATENT DOCUMENTS

| | | |
|---|---|---|
| JP | 2000011105 A | 1/2000 |
| JP | 2006517378 A | 7/2006 |
| JP | 2008011696 | 1/2008 |
| JP | 2010515425 A | 5/2010 |
| TW | 329503 | 4/1998 |
| WO | 2004068726 A2 | 8/2004 |
| WO | WO-2008081405 A1 | 7/2008 |
| WO | WO2008125072 A1 | 10/2008 |

OTHER PUBLICATIONS

International Search Report and Written Opinion—PCT/US2010/024161, International Search Authority—European Patent Office—Sep. 17, 2010.

Taiwan Search Report—TW099104920—TIPO—Dec. 5, 2012.

* cited by examiner

WIRELESS POWER FOR CHARGEABLE AND CHARGING DEVICES

CLAIM OF PRIORITY UNDER 35 U.S.C. §119

This application claims priority under 35 U.S.C. §119(e) to:

U.S. Provisional Patent Application 61/152,359 entitled "UNIVERSAL WIRELESS AND WIRED CHARGER (MULTI-FREQUENCY, MULTI-VERSION AND MULTI-REVISION)" filed on Feb. 13, 2009, the disclosure of which is hereby incorporated by reference in its entirety.

BACKGROUND

1. Field

The present invention relates generally to wireless electronic devices, and more specifically to electronic devices configured for wireless communication, wireless charging, and enabling for an optimal charging scenario.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas may be of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach may have the capability to simultaneously charge multiple devices in the same area, this area is typically small, hence the user must locate the devices to a specific area.

A need exists for wireless power devices configured for detecting other wireless power devices and determining optimal charging solutions. More specifically, a need exists for a chargeable device configured to detect one or more wireless chargers and, thereafter, determine an optimal charging solution for receiving a charge. Further, a need exists for a wireless charger configured to detect one or more chargeable devices and, thereafter, determine an optimal charging solution for charging at least one of the one or more detected chargeable devices.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
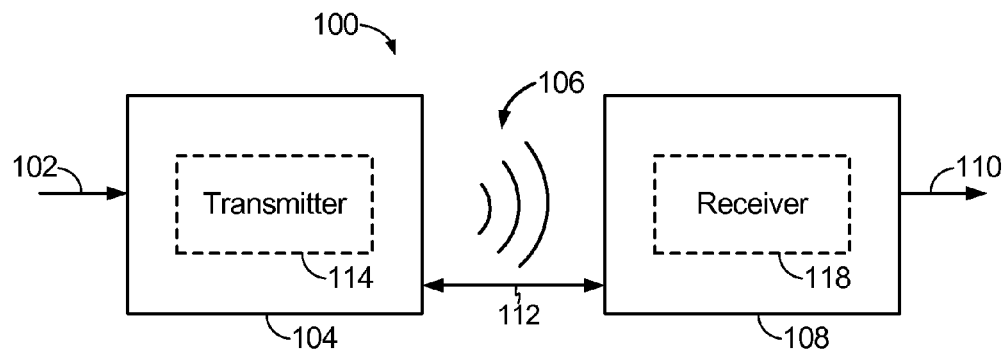
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
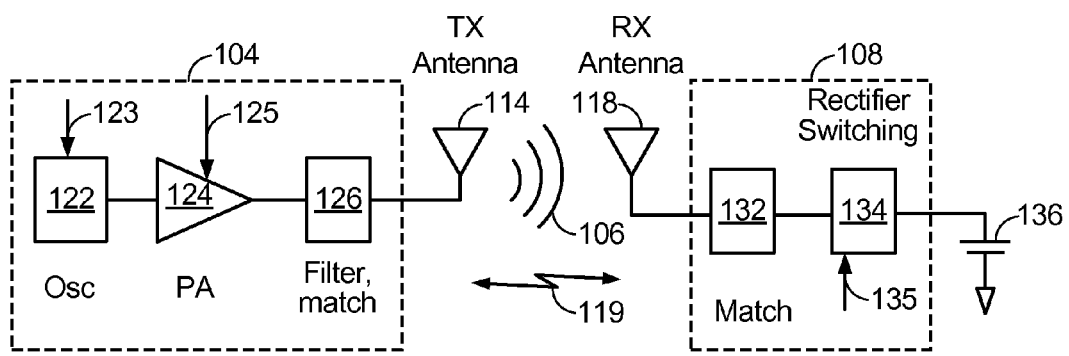
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
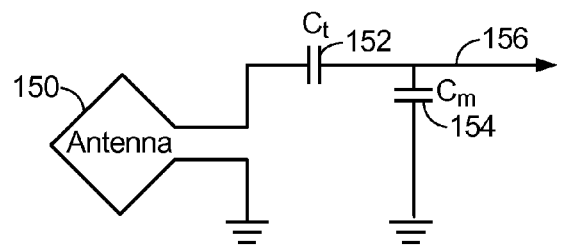
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
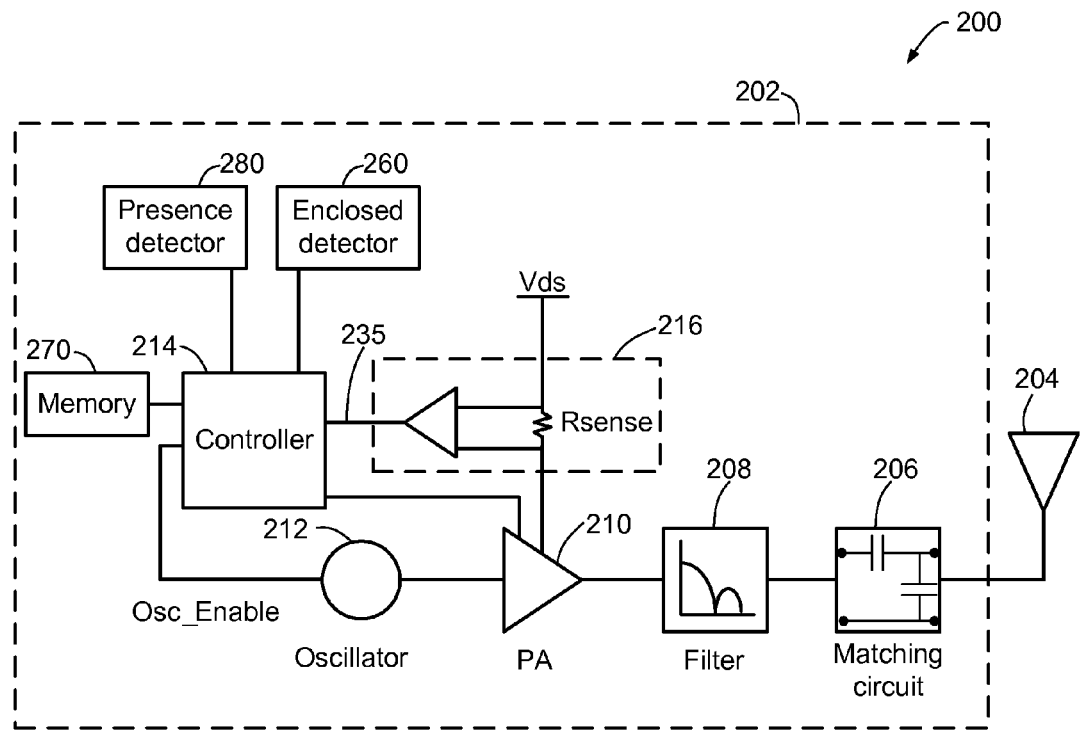
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
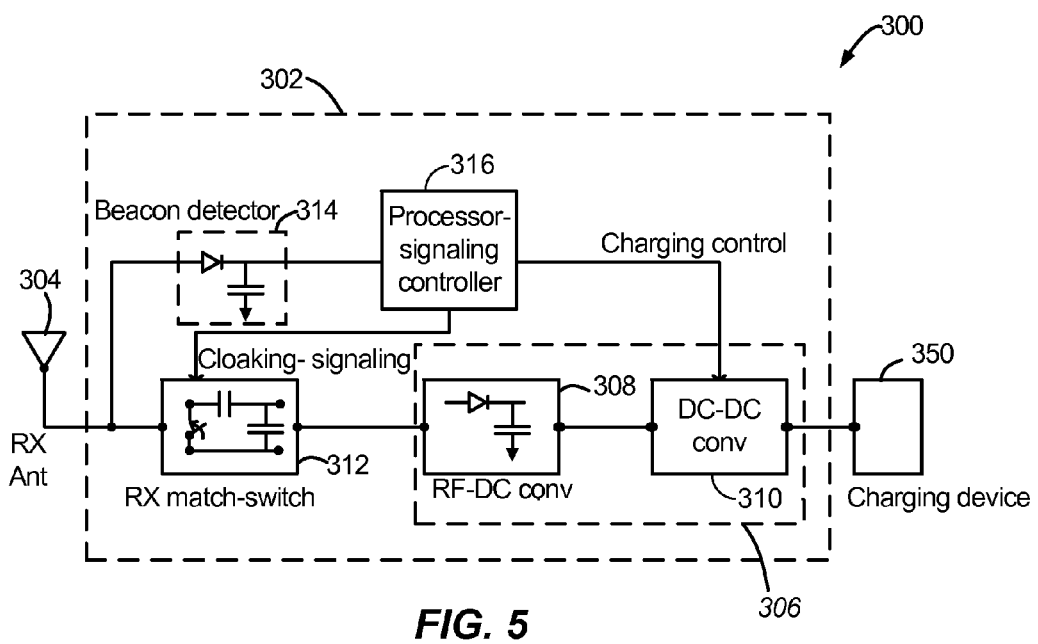
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. This "unloading" of a receiver is also known herein as a "cloaking" A receiver may also be cloaked in order to eliminate coupling to other nearby receivers or to reduce loading on nearby transmitters. Furthermore, this switching between unloading and loading as controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

In an exemplary embodiment, communication between the transmitter and the receiver refers to a device sensing and charging control mechanism, rather than conventional two-way communication. In other words, the transmitter uses, for example, on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as signal forming a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
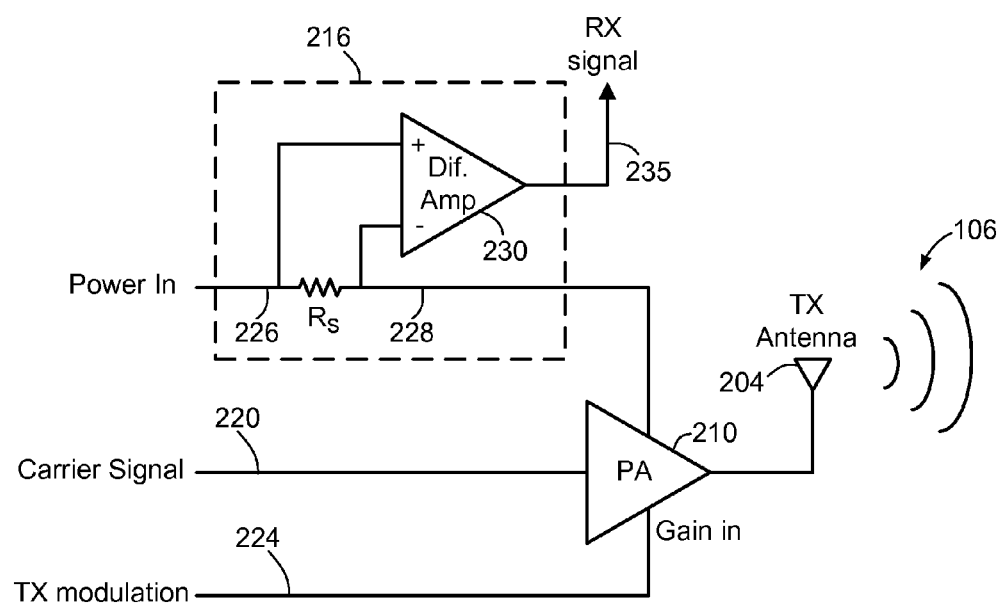
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is deactivated, the power amplifier will not drive any signal on the transmit antenna 204.

The transmit circuitry of FIG. 6 also includes a load sensing circuit 216 that supplies power to the power amplifier 210 and generates a receive signal 235. In the load sensing circuit 216, a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

Details of some exemplary embodiments for cloaking signals, beacon signals, and circuits for generating these signals can be seen in U.S. Utility patent application Ser. No. 12/249,873, entitled "REVERSE LINK SIGNALING VIA RECEIVE ANTENNA IMPEDANCE MODULATION" filed on Oct. 10, 2008; and in U.S. Utility patent application Ser. No. 12/249,861, entitled "TRANSMIT POWER CONTROL FOR A WIRELESS CHARGING SYSTEM" filed on Oct. 10, 2008, both herein incorporated by reference in their entirety.

Details of exemplary communication mechanisms and protocols can be seen in U.S. Utility patent application Ser. No. 12/249,866 entitled "SIGNALING CHARGING IN WIRELESS POWER ENVIRONMENT" filed on Oct. 10, 2008, the contents of which is incorporated by reference herein in its entirety.

Figure 7:
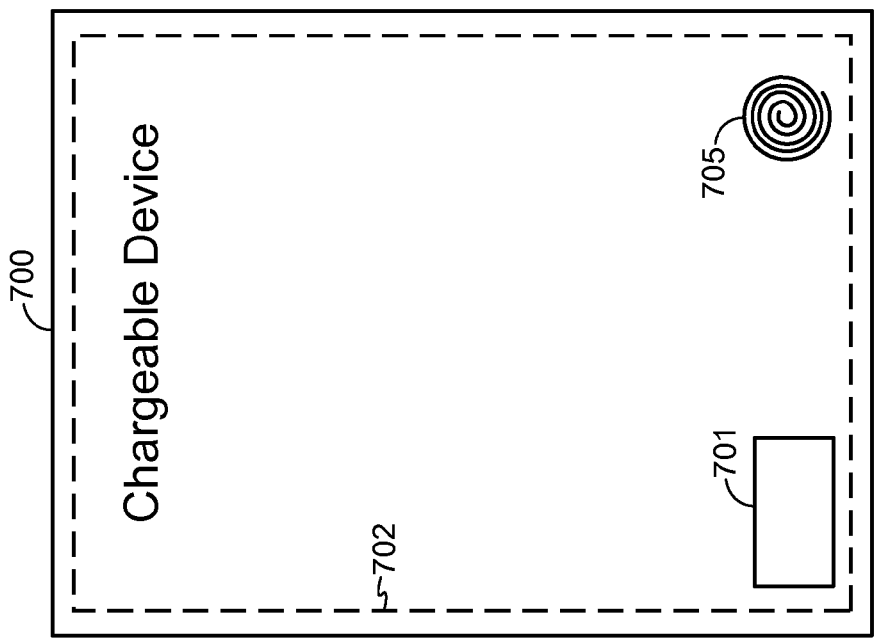
FIG. 7 illustrates a chargeable device, in accordance with an exemplary embodiment of the present invention.

FIG. 7 depicts a chargeable device 700 that may comprise any known and suitable chargeable device. As non-limiting examples, chargeable device 700 may comprise a cellular telephone, a portable media player, a camera, a gaming device, a navigation device, a headset (e.g., a Bluetooth headset), a tool, a toy, or any combination thereof. Chargeable device 700 may include at least one receive antenna 702, at least one coil 705, or any combination thereof. Each of receive antenna 702 and coil 705 may be configured to receive power wirelessly transmitted from a suitable wireless power source. More specifically, according to one exemplary embodiment, antenna 702 and an associated receiver, such as receiver 108 of FIG. 2, may be configured to receive wireless power transmitted from a wireless power source within an associated near-field region. Further, according to another exemplary embodiment, coil 705 and an associated receiver, such as receiver 108 of FIG. 2, may be configured to receive wireless power transmitted from a wireless power source via inductive coupling. Additionally, chargeable device 700 may be configured to store received power within a battery (e.g., battery 136 of FIG. 2) of chargeable device 700. It is noted that the terms "receive antenna" and "coil" may each be referred to herein as a "receive element."

Furthermore, in accordance with various exemplary embodiments, chargeable device 700 may be configured to detect one or more wireless chargers, which are positioned within a charging region of chargeable device 700 and include one or more wireless transmit elements (e.g., a wireless transmit antenna or a coil). More specifically, chargeable device 700 may be configured to detect one or more wireless chargers according to one or more specific protocols and/or one or more specific frequencies. For example only, chargeable device 700 may be configured to detect one or more wireless chargers by sampling for wireless chargers operating with one or more specific wireless charging protocols, sampling for wireless chargers resonating at one more specific frequencies, or both. As described more fully below, upon detection of a wireless charger, chargeable device 700 may be configured to determine an amount of power received from the detected wireless charger, including at each frequency and with each protocol that the detected wireless charger is configured to transmit.

According to one exemplary embodiment, chargeable device 700 may be configured to detect a wireless charger, which is positioned within a near-field region of chargeable device 700 and is configured to wirelessly transmit power at one or more suitable frequencies (e.g., unlicensed ISM bands) via a near-field resonance protocol. It is noted that various frequencies may be suitable for wireless power transmission in one location (e.g., a first country) but not suitable in another location (e.g., a second country). As such, according to one exemplary embodiment, chargeable device 700 may be configured to determine its location via a location device 701, and, thereafter, determine which one or more frequencies are suitable for wireless power transmission. For example only, location device 701 may comprise a Global Positioning System (GPS) device. By way of example only, chargeable device 700 may be configured to detect a wireless charger positioned within an associated near-field region and configured to transmit wireless power, via near-field resonance, at one or more of 6.78 MHz, 13.56 MHz, 27.12, and 40.68 MHz. Further, according to one exemplary embodiment, chargeable device 700 may be configured to detect a wireless charger positioned within an associated charging region and configured to convey wireless power via an inductive coupling protocol.

Moreover, chargeable device 700 may be configured to establish a communication link with a detected wireless charger and, upon establishing the communication link, may wirelessly receive data (e.g., audio files, data files, or video files) from the detected wireless charger, wirelessly transmit data to the detected wireless charger, or both. It is noted that chargeable device 700 may be configured to detect and receive wireless power from multiple versions of wireless chargers. It is noted further that chargeable device 700 may be configured to identify a version of a detected wireless charger and, as a result, may receive wireless power from and communicate with the detected wireless charger accordingly. Additionally, upon establishing the communication link, chargeable device 700 may be configured to control an operation of a detected wireless charger (e.g., transmission of power, synchronization of data, displaying media, or any user-interface functionality).

Upon detection of one or more wireless chargers, chargeable device 700 may be further configured to select at least one of the detected one or more wireless charging to receive power therefrom for optimizing an amount of power received by chargeable device 700. A method of optimizing an amount of power received by chargeable device 700 may be based on at least one of one or more charging protocols of each detected wireless charger, one or more charging frequencies of each detected wireless charger, a position of each detected wireless charger relative to chargeable device 700, and a version of each detected wireless charger. It is noted that relatively small chargeable devices (e.g., a Bluetooth headset) may charge more efficiently at a higher frequency (e.g., 40.68 MHz) in comparison to a lower frequency (6.78 MHz). On the other hand, relatively large chargeable devices (e.g., a camera) may charge more efficiently at a lower frequency (e.g., 6.78 MHz) in comparison to a higher frequency (40.68 MHz).

Figure 8:
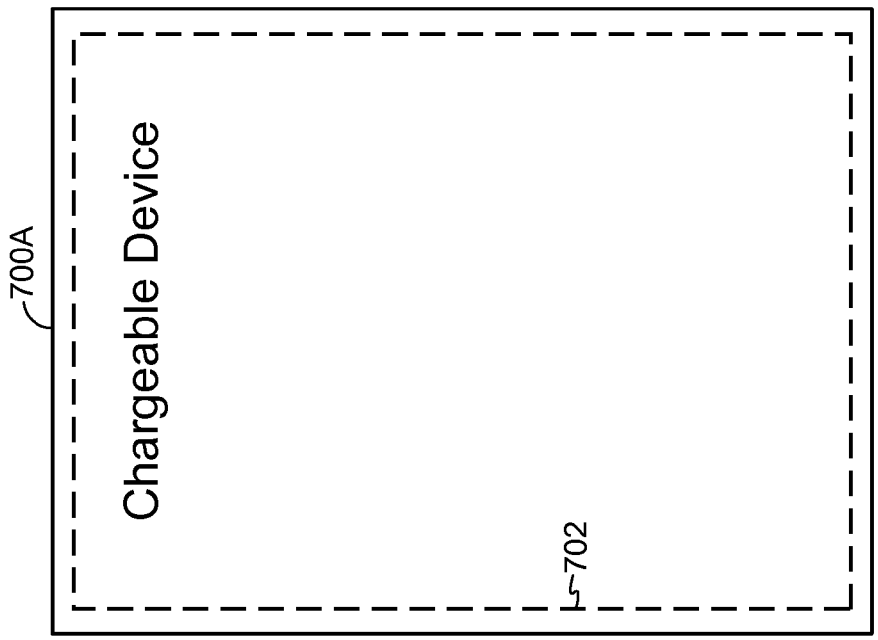
FIG. 8 illustrates another chargeable device, according to an exemplary embodiment of the present invention.

FIG. 8 illustrates a chargeable device 700A, which is similar to chargeable device 700 of FIG. 7 and, therefore, will not be explained again. However, in FIG. 8, chargeable device 700A does not include a coil and only includes one receive antenna 702. It is noted that in an embodiment wherein chargeable device 700A includes a single receive element (i.e., receive antenna 702), chargeable device 700A may be configured to receive wireless power from only one wireless transmit element at any one time. Accordingly, in this exemplary embodiment, chargeable device 700A may be configured to determine which detected wireless charger may enable for optimal charging. Stated another way, chargeable device 700A may be configured to determine which detected wireless charger and, more specifically, which transmit element of the one or more detected wireless chargers may enable for maximum efficiency, maximum charging rate, minimum interference, or any combination thereof. Further, according to another exemplary embodiment, chargeable device 700A may be configured to determine which plurality of transmit elements of the one or more detected wireless chargers, utilizing a time domain multiplexing method based upon allocated activation time slots for each selected transmit element, may enable for maximum efficiency, maximum charging rate, minimum interference, or any combination thereof.

Figure 9:
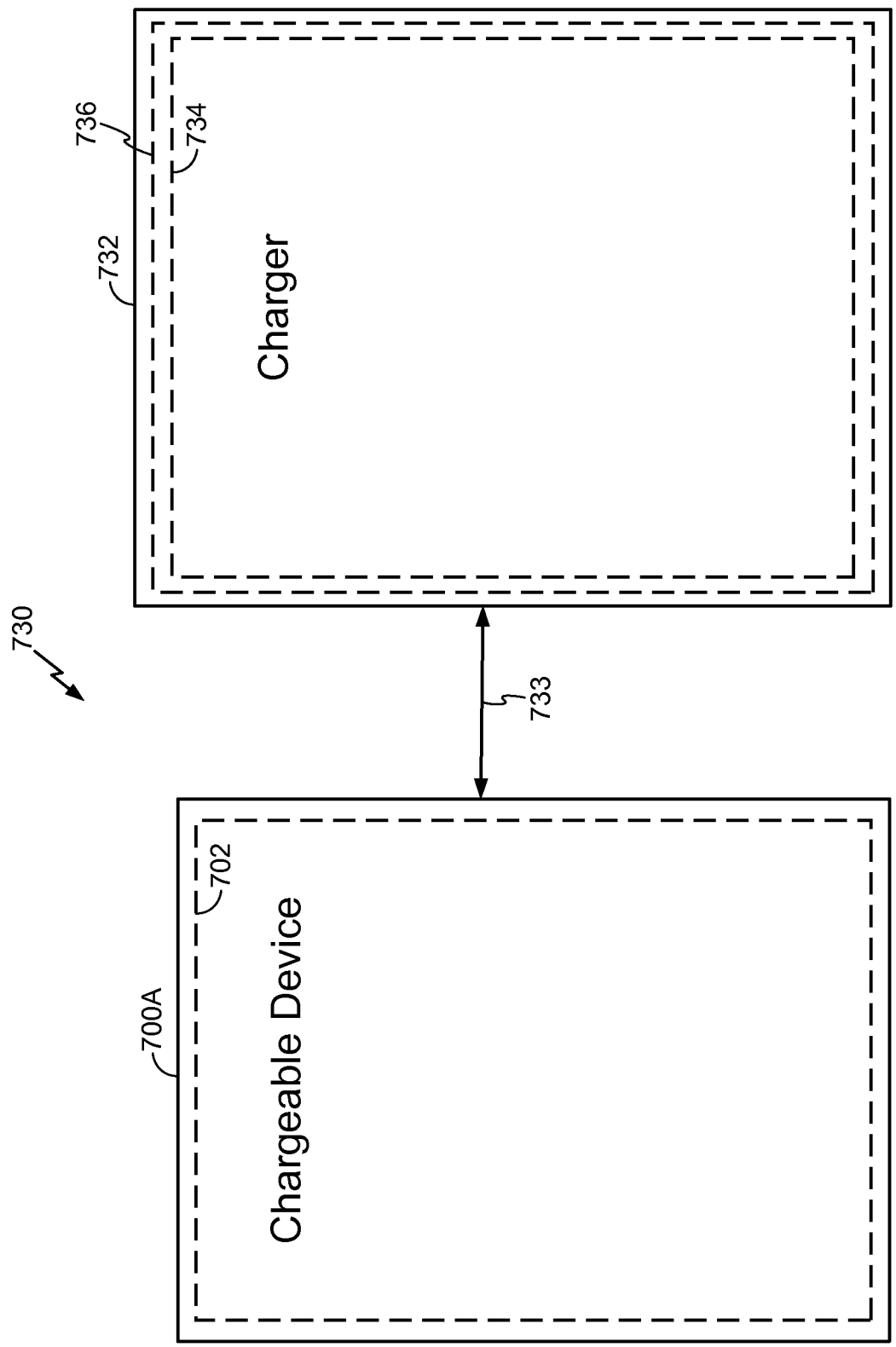
FIG. 9 illustrates a system including a wireless charger and a chargeable device, according to an exemplary embodiment of the present invention.

FIG. 9 illustrates a system 730 including chargeable device 700A and a wireless charger 732. Wireless charger 732 includes a first transmit antenna 734 configured to transmit wireless power at a frequency of, for example only, 13.56 MHz. Further, wireless charger 732 includes a second transmit antenna 736 configured to transmit wireless power at a frequency of, for example only, 6.78 MHz. According to one contemplated operation of system 730, chargeable device 700 may detect wireless charger 732, which is positioned within an associated charging region and operating with one or more specific protocols (e.g., near-field resonance) and/or resonating at one or more specific frequencies (e.g., 6.78 MHz and 13.56 MHz). Further, upon detection of wireless charger 732, a communication link 733 between chargeable device 700A and wireless charger 732 may be established. Moreover, after wireless charger 732 has been detected, an optimal scenario for charging chargeable device 700A with wireless charger 732 may be determined.

According to one exemplary embodiment, determining an optimal charging scenario may include determining which single protocol (i.e., either near-field resonance via transmit antenna 734 or near-field resonance via transmit antenna 736) enables for optimal charging (e.g., maximum efficiency, maximum charging rate, minimum interference, or any combination thereof) of chargeable device 700A. As an example, chargeable device 700A, wireless charger 732, or a combination thereof, may determine that transmit antenna 736 enables for optimal charging of chargeable device 700A. As a more specific example, chargeable device 700A may receive wireless power from transmit antenna 734 at a first frequency (e.g., 13.56 MHz.), determine an amount of power received from transmit antenna 734 and, thereafter, provide this information to wireless charger 732. Further, chargeable device 700A may receive wireless power from transmit antenna 736 at a second frequency (e.g., 6.78 MHz.), determine an amount of power received from transmit antenna 736 and, thereafter, provide this information to wireless charger 732. Wireless charger 732 may then inform chargeable device 700A, via communication link 733, which protocol (i.e., either near-field resonance via transmit antenna 734 or near-field resonance via transmit antenna 736) facilitates optimal charging by wireless charger 732. After determining which transmit element facilitates optimal charging, chargeable device 700A, wireless charger 732, or a combination thereof, may select the transmit element, and wireless power may be transmitted to chargeable device 700A.

It is noted that upon receiving information from chargeable device 700A relating to an amount of power received from a specific transmit element (e.g., transmit antenna 734 or transmit antenna 736), wireless charger 732 may be configured to increase or decrease an amount of power transmitted from the specific transmit element. It is further noted that depending on the type of device (i.e., whether chargeable device 700A is, for example only, a mobile telephone, a media player, or a Bluetooth headset) and/or a type of battery within chargeable device 700A, wireless charger 732 may be configured to increase or decrease an amount of power transmitted from a specific transmit element.

According to another exemplary embodiment, determining an optimal charging scenario may include determining which plurality of transmit elements, utilizing a time domain multiplexing method, may provide for optimal charging. As an example, chargeable device 700A, wireless charger 732, or a combination thereof, may determine that transmit antenna 734 may be time multiplexed with transmit antenna 736 to enable for optimized charging of chargeable device 700A.

Figure 10:
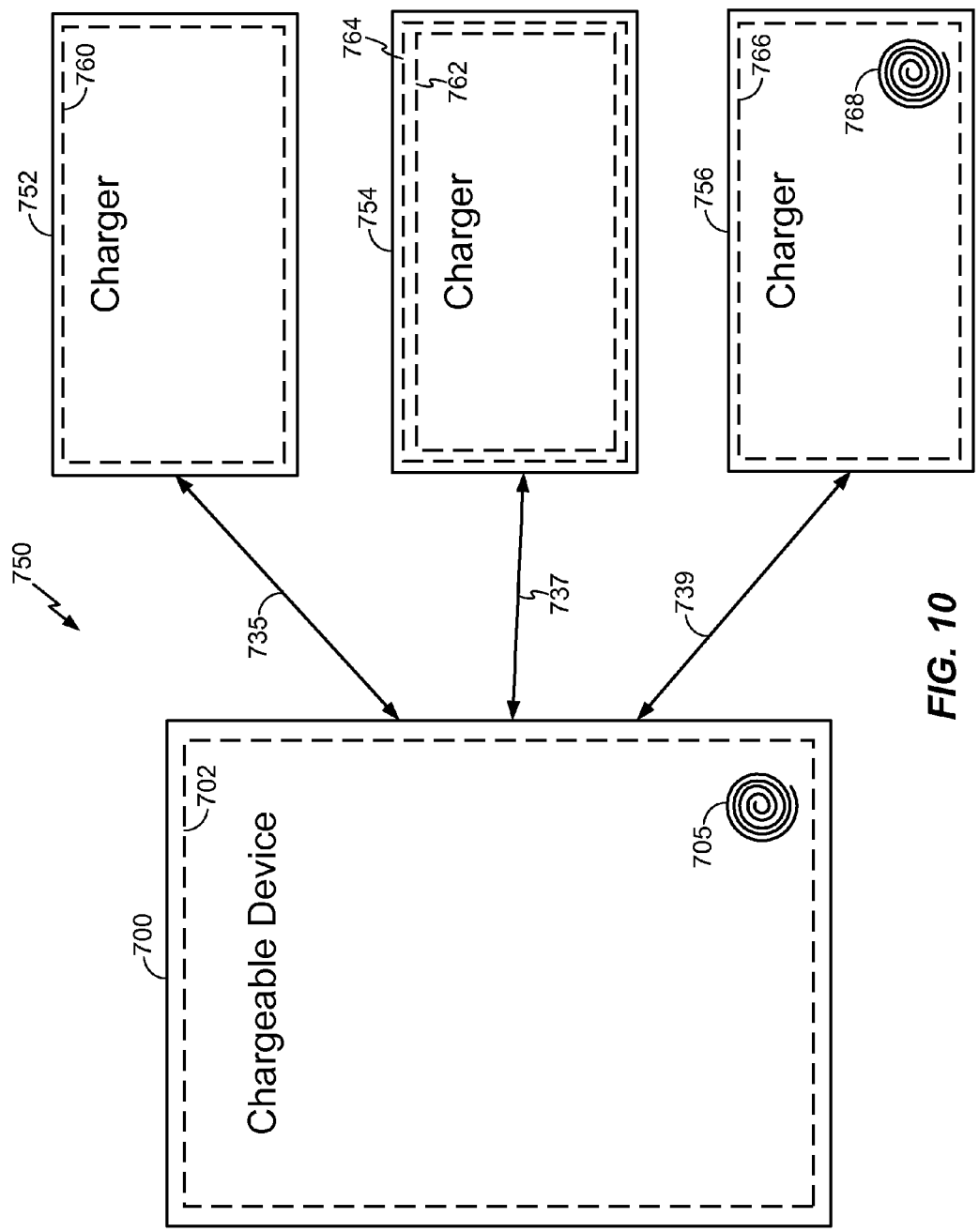
FIG. 10 illustrates a system including a plurality of wireless chargers and a chargeable device, in accordance with an exemplary embodiment of the present invention.

FIG. 10 illustrates another system 750 including chargeable device 700. System 750 further includes a first wireless charger 752, a second wireless charger 754, and a third wireless charger 756, each of which is positioned within an associated charging region of chargeable device 700. As illustrated in FIG. 10, first wireless charger 752 includes a transmit antenna 760 and may be configured to transmit wireless power at a frequency of, for example only, 40.68 MHz. Further, second wireless charger 754 includes a first transmit antenna 762 configured to transmit wireless power at a frequency of, for example only, 27.12 MHz., and a second transmit antenna 764 configured to transmit wireless power at a frequency of, for example only, 6.78 MHz. Moreover, third wireless charger 756 includes a transmit antenna 766 configured to transmit wireless power at a frequency of, for example only, 13.56 MHz. Third wireless charger 756 further includes a coil 768 configured to transmit power, via inductive coupling, to a coil (e.g., coil 705) adequately aligned therewith.

According to one contemplated operation of system 750, chargeable device 700 may detect one or more wireless chargers positioned within an associated charging region and operating with one or more specific protocols (e.g., near-field resonance and/or inductive coupling) and/or resonating at one or more specific frequencies (e.g., unlicensed ISM bands). Accordingly, chargeable device 700 may detect each of first wireless charger 752, second wireless charger 754, and third wireless charger 756. Moreover, upon detection, respective communication links 735, 737, and 739 may be established between chargeable device 700 and first wireless charger 752, second wireless charger 754, and third wireless charger 756.

Furthermore, upon detection of first wireless charger 752, second wireless charger 754, and third wireless charger 756, an optimal charging scenario for charging chargeable device 700 may be determined. Determining an optimal charging scenario may include, as noted above, determining an optimal charging scenario for one or more detected wireless chargers that may include one or more protocols and/or are configured to transmit wireless power at one or more frequencies. Furthermore, determining an optimal charging scenario may include determining which plurality of transmit elements within one or more detected wireless chargers, utilizing a time domain multiplexing method, may provide for optimal charging. For example, according to one exemplary embodiment, chargeable device 700 may be configured to sequentially receive wireless power from each individual transmit element within system 750. Further, after receiving wireless power from each individual transmit element within system 750, chargeable device 700 may be configured to determine which one or more transmit elements enable for optimal charging.

More specifically, for example, receive antenna 702 may be configured to receive wireless power from transmit antenna 760, via near-field resonance, at a frequency (e.g., 40.68 MHz.), and an amount of power received from transmit antenna 760 may be determined by chargeable device 700. In addition, receive antenna 702 may be configured to receive wireless power from transmit antenna 762, via near-field resonance, at a frequency (e.g., 27.12 MHz.), and chargeable device 700 may determine an amount of power received from transmit antenna 762. Further, receive antenna 702 may be configured to receive wireless from power transmit antenna 764, via near-field resonance, at a frequency (e.g., 6.78 MHz.), and an amount of power received from transmit antenna 764 may be determined by chargeable device 700. Moreover, transmit antenna 700 may be configured to receive wireless power from transmit antenna 766, via near-field resonance, at a frequency (e.g., 6.78 MHz.), and an amount of power received from transmit antenna 766 may be determined by chargeable device 700. Furthermore, coil 705 may be configured to receive wireless power, via inductive coupling, from coil 768 of wireless charger 756 and chargeable device 700 may determine an amount of received from coil 768. Thereafter, chargeable device 700 may determine which one or more transmit elements enable for maximum efficiency, maximum charging rate, minimum interference, or any combination thereof. Accordingly, as an example, chargeable device 700 may determine that wireless charger transmit antenna 762 of wireless charger 754 and coil 768 of wireless charger 756 enable for optimal charging. After determining which one or more transmit elements enable for an optimal charging scenario, chargeable device 700 may select the one or more transmit elements and wireless power may be transmitted to chargeable device 700A accordingly.

Furthermore, as noted above, a time domain multiplexing method may be utilized to provide for optimal charging. As such, chargeable device 700 may be configured to determine an optimal charging scenario by utilizing a time domain multiplexing method based upon allocated activation time slots for two or more transmit elements. Accordingly, as an example, chargeable device 700 may determine that, in addition to receiving wireless power from coil 768, transmit antenna 760 of wireless charger 752 may be time multiplexed with transmit antenna 766 of wireless charger 756 to enable for optimized charging.

Figure 11:
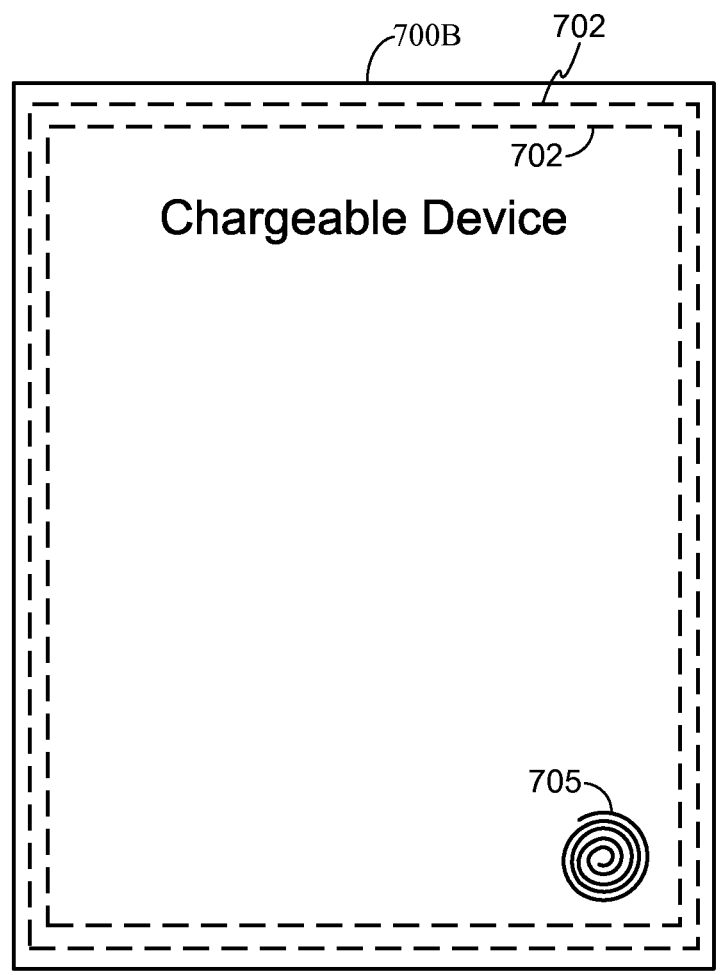
FIG. 11 illustrates a chargeable device having a plurality of receive antennas, according to an exemplary embodiment of the present invention.

FIG. 11 depicts a chargeable device 700B, which is similar to chargeable device 700 of FIG. 7 and, therefore, will not be explained again. However, in FIG. 11, chargeable device 700B includes a plurality of receive antennas 702. Although chargeable device 700B is depicted as having only two receive antennas 702, chargeable device 700B may include any number of receive antennas 702. Similarly to chargeable device 700, chargeable device 700B may be configured to detect one or more wireless chargers positioned within an associated charging region and including one or more transmit elements. Furthermore, upon detection of one or more wireless chargers, chargeable device 700B may be configured to optimize an amount of power received from the one or more wireless chargers and, more specifically, the one or more transmit elements. It is noted that in an embodiment wherein chargeable device 700B includes multiple receive antennas, chargeable device 700B may be configured to receive wireless power from multiple transmit antennas associated with one or more wireless chargers at any one time.

Determining an optimal charging scenario may include determining an optimal charging scenario for one or more detected wireless chargers that may include one or more protocols and/or may be configured to transmit wireless power at one or more frequencies. More specifically, determining an optimal charging scenario may include determining which plurality of transmit elements associated with one or more detected wireless chargers enables for optimal charging of chargeable device 700B. It is noted that in an embodiment wherein chargeable device 700B includes multiple antennas, a time domain multiplexing method, as mentioned above, may still be used.

Figure 12:
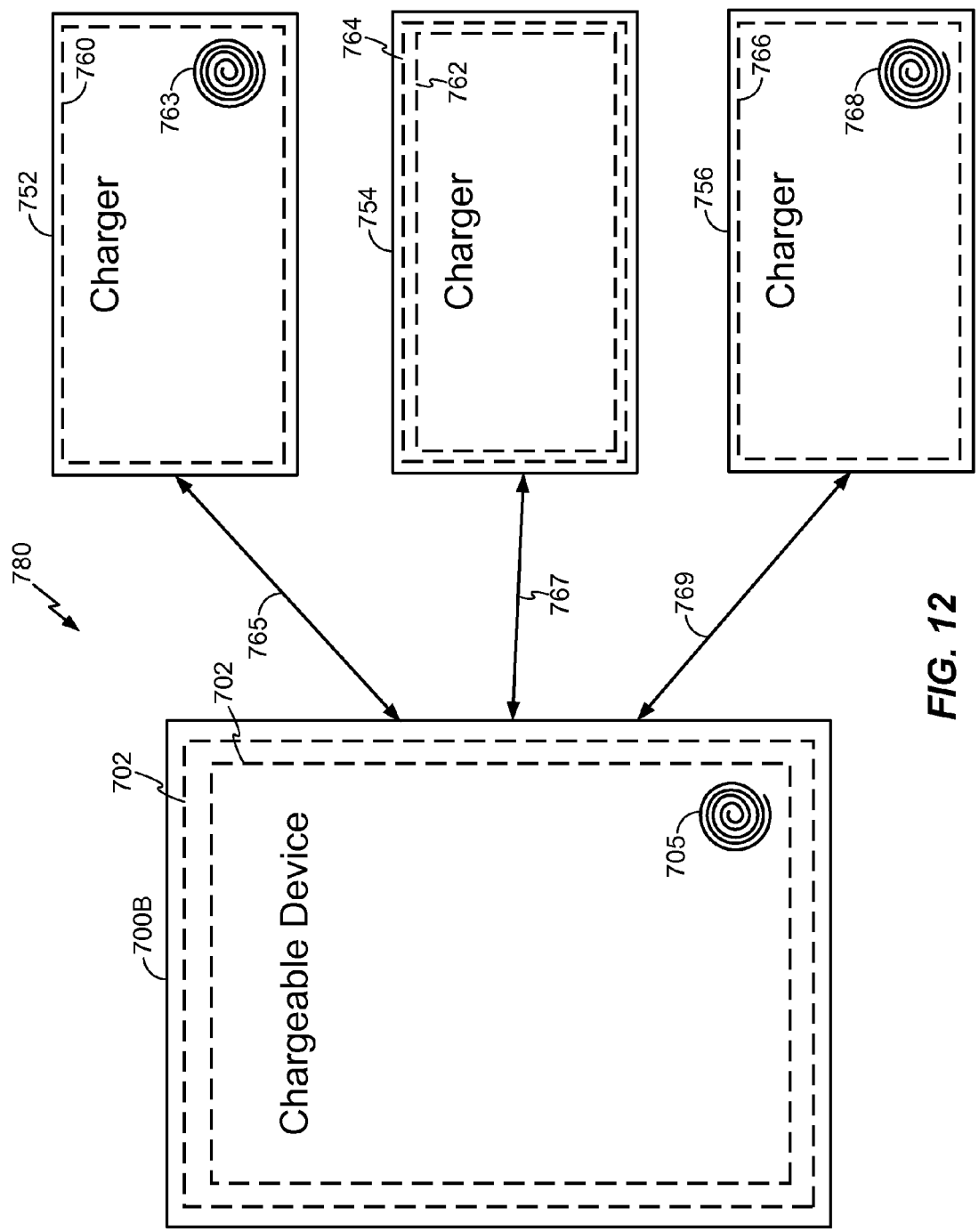
FIG. 12 illustrates a system including a plurality of wireless chargers and a chargeable device having a plurality of receive antennas, according to an exemplary embodiment of the present invention.

FIG. 12 illustrates a system 780 including chargeable device 700B. System 780 further includes first wireless charger 752, second wireless charger 754, and third wireless charger 756, each of which is positioned within an associated charging region of chargeable device 700B. First wireless charger 752, second wireless charger 754, and third wireless charger 756 have been described above and, therefore, will not be explained again. However, it is noted that first wireless charger 752 includes a coil 763. According to one contemplated operation of system 780, chargeable device 700B may detect one or more wireless chargers within an associated charging region and operating with one or more specific protocols (e.g., near-field resonance and/or inductive coupling) and/or resonating at one or more specific frequencies (i.e., unlicensed ISM bands). Accordingly, chargeable device 700B may detect each of first wireless charger 752, second wireless charger 754, and third wireless charger 756.

Moreover, upon detection thereof, respective communication links 765, 767, and 769 may be established between chargeable device 700B and first wireless charger 752, second wireless charger 754, and third wireless charger 756. As noted above with respect to chargeable device 700, upon establishing a communication link with a detected wireless charger, chargeable device 700B may be configured to control an operation of a detected wireless charger (e.g., transmission of power, synchronization of data, displaying media, or any user-interface functionality). Further, upon detection of first wireless charger 752, second wireless charger 754, and third wireless charger 756, chargeable device 700B may be configured to determine an optimal charging scenario.

For example, with reference to FIG. 12, chargeable device 700B may be configured to sequentially receive wireless power from each individual transmit element (i.e., transmit antenna 760, transmit antenna 762, transmit antenna 764, transmit antenna 766, coil 763, and coil 768). Furthermore, chargeable device 700B may be configured to sequentially receive wireless power from every possible and suitable combination of two or more transmit elements. It is noted that chargeable device 700B may only simultaneously receive power from a number of transmit antennas equal to a number of receive antennas 702. For example, if chargeable device 700B comprises two receive antennas 702, chargeable device 700B may be configured to simultaneously receive wireless power from every possible combination of two transmit antennas. However, it is noted that coil 705 may simultaneously receive wireless power from both coil 763 and 768, so long as coil 763 and 768 are each in phase with coil 705.

After determining an amount of power received from each suitable combination of transmit elements, and optionally each transmit element individually, chargeable device 700B may be configured to identify one or more transmit elements for optimal charging. By way of example, in an embodiment wherein chargeable device 700B includes two antennas 702, charging device 700B may identify transmit antenna 764, transmit antenna 766, and coil 763 as transmit elements for enabling an optimal charging scenario. As another example, charging device 700B may identify transmit antenna 766, transmit antenna 762, and coil 768 as transmit elements for enabling an optimal charging scenario. Further, chargeable device 700B may be configured to determine an optimal charging scenario by utilizing a time domain multiplexing method based upon allocated activation time slots for two or more transmit antennas.

Figure 13:
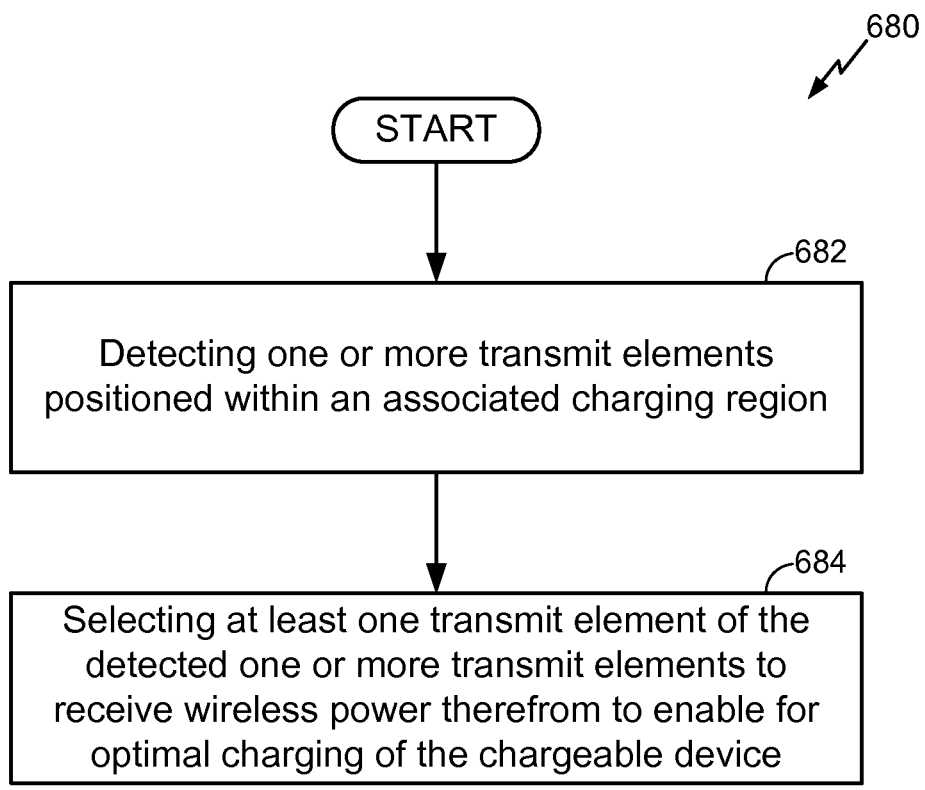
FIG. 13 is a flowchart illustrating a method, according to an exemplary embodiment of the present invention.

FIG. 13 is a flowchart illustrating a method 680, in accordance with one or more exemplary embodiments. Method 680 may include detecting one or more transmit elements positioned within an associated charging region (depicted by numeral 682). Method 680 may further include selecting at least one transmit element of the detected one or more transmit elements to receive wireless power therefrom to enable optimal charging of the chargeable device (depicted by numeral 684).

Figure 14:
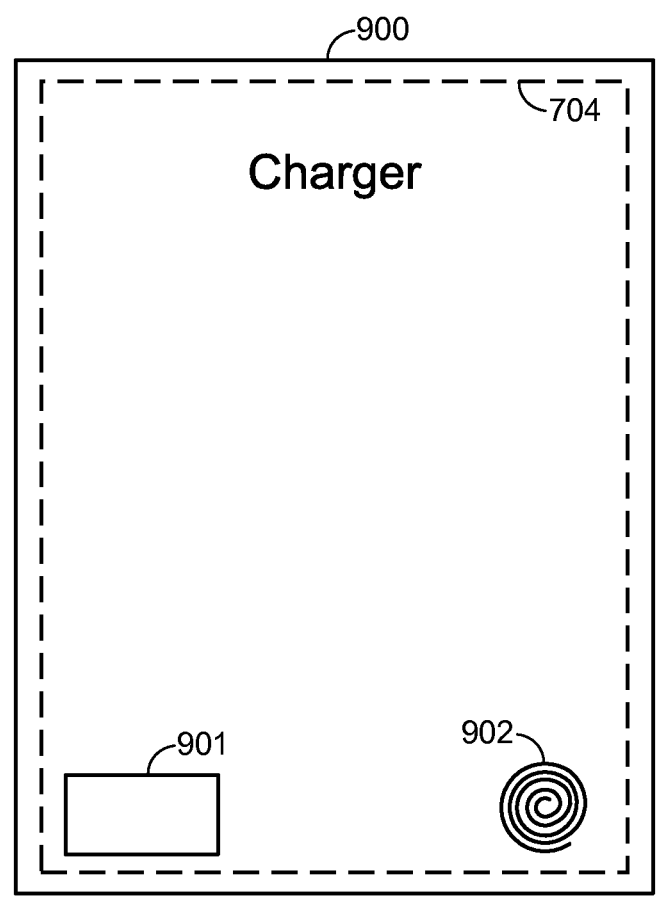
FIG. 14 illustrates a wireless charger, according to an exemplary embodiment of the present invention.

FIG. 14 depicts a charger 900 that may comprise any known and suitable charger configured to transmit wireless power. Charger 900 may include at least one transmit antenna 704 configured to wirelessly transmit power to at least one chargeable device (e.g., chargeable device 700). More specifically, transmit antenna 704 and an associated transmitter, such as transmitter 104 of FIG. 2, may be configured to transmit wireless power at a frequency (e.g., an unlicensed ISM band) to a receiver within an associated near-field region. Further, charger 900 may include at least one coil 902 configured to transmit wireless power to a chargeable device (e.g., chargeable device 700) via inductive coupling.

Furthermore, in accordance with various exemplary embodiments of the present invention, charger 900 may be configured to detect one or more chargeable devices, which are positioned within a charging region of charger 900 and are configured to receive wireless power via a suitable protocol.

More specifically, charger 900 may be configured to detect one or more chargeable devices according to one or more specific protocols, one or more specific frequencies, or both. For example only, charger 900 may be configured to detect chargeable devices within a charging region by sampling for chargeable devices operating with specific wireless charging protocols, sampling for chargeable devices resonating at specific wireless charging frequencies, or both.

According to one exemplary embodiment, charger 900 may be configured to detect one or more chargeable devices positioned within an associated near-field region and configured to receive wireless power at one or more frequencies via near-field resonance. For example only, charger 900 may be configured to detect one or more chargeable devices positioned within an associated near-field region and configured to receive wireless power, via near-field resonance, at a suitable frequency, such as an unlicensed ISM band (e.g., 13.56 MHz). It is noted that various frequencies may be suitable for wireless power transmission in one location (e.g., a first country) but not suitable in another location (e.g., a second country). As such, according to one exemplary embodiment, charger 900 may be configured to determine its location via a location device 901 and, thereafter, determine which one or more frequencies are suitable for wireless power transmission. For example only, location device 901 may comprise a Global Positioning System (GPS) device. Further, according to one exemplary embodiment, charger 900 may be configured to detect one or more chargeable devices positioned within an associated charging region and configured to receive wireless power via an inductive coupling protocol.

Moreover, charger 900 may be configured to establish a communication link with a detected chargeable device and, upon establishing the communication link, may wirelessly receive data (e.g., audio files, data files, or video files) from the chargeable device, wirelessly transmit data to the chargeable device, or both. Additionally, it is noted that charger 900 may be configured to perform various operations (e.g., synchronizing data and/or displaying media) while transmitting power to one or more chargeable devices. Furthermore, charger 900 may be configured to detect and transmit wireless to multiple versions of chargeable devices. Accordingly, charger 900 may be configured to identify a version of a detected chargeable device and transmit power to and communicate with the detected chargeable device in a suitable manner. It is further noted that charger 900 may attempt to communicate with each detected chargeable device according to a common version protocol. However, in the event that a detected chargeable device is not compatible with the common version protocol, charger 900 may be configured to communicate with the chargeable device in a suitable manner using a suitable version protocol.

Additionally, upon detection of one or more chargeable devices, charger 900 may be configured to determine an optimal charging solution which may maximize efficiency, maximize charging rates, minimize interference, or any combination thereof, for charging the one or more detected chargeable devices. More specifically, for example, charger 900 may be configured to determine an optimal solution for providing wireless power to one or more of the detected chargeable devices for a given set of conditions (e.g., the number of available transmit elements within charger 900 compared to the number of detected chargeable devices, the charging levels of each of the detected chargeable devices, or the amount of power received by each detected chargeable devices (i.e., the charging efficiency between charger 900 and each of the detected chargeable devices)).

Figure 15:
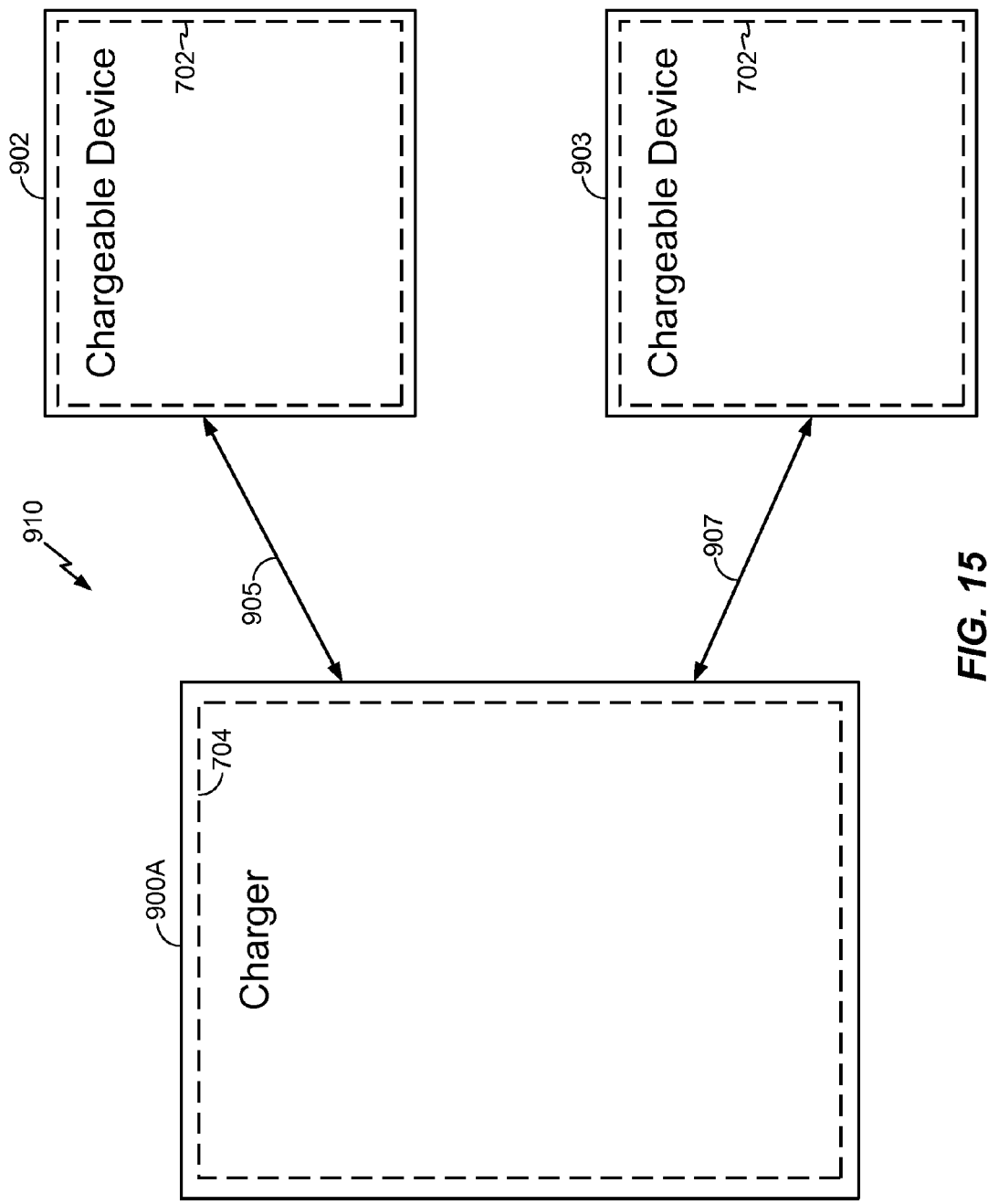
FIG. 15 illustrates a system including a wireless charger and a plurality of chargeable devices, according to an exemplary embodiment of the present invention.

FIG. 15 illustrates a system 910 including a charger 900A, a first chargeable device 902, and a second chargeable device 903. As illustrated, each of first chargeable device 902 and second chargeable device 903 include a receive antenna 702 and each are configured to receive wireless power transmitted at a specific frequency via near-filed resonance. It is noted that charger 900A is similar to charger 900 of FIG. 13 and, therefore, will not be described in detail. However, it is noted that charger 900A does not include a coil and only includes a single transmit antenna 704.

According to one contemplated operation of system 910, charger 900A may detect each of first chargeable device 902 and second chargeable device 903 via any suitable manner. According to one contemplated operation of system 910, charger 900A may detect each of first chargeable device 902 and second chargeable device 903, each of which being positioned within an associated charging region and operating with one or more wireless power protocols (e.g., near-field resonance) and/or resonating at one or more wireless power frequencies (e.g., unlicensed ISM bands). Moreover, upon detection thereof, respective communication links 905 and 907 may be established between charger 900A and each of first chargeable device 902 and second chargeable device 903. Furthermore, upon detection of first chargeable device 902 and second chargeable device 903, charger 900A may determine an optimal charging solution for system 910. It is noted that in an embodiment wherein charger 900A includes a single transmit element (i.e., transmit antenna 704), charger 900A may be configured to transmit wireless power to only one chargeable device at any one time.

As such, according to one exemplary embodiment, charger 900A may be configured to determine which single detected chargeable device (i.e., either first chargeable device 902 or second chargeable device 903) should be charged to enable for an optimal charging solution. As one example, charger 900A may be configured to determine charging efficiencies between charger 900A and each of first chargeable device 902 and second chargeable device 903. Thereafter, to reduce power loss, charger 900A may be configured to convey wireless power to the device that has the highest charging efficiency. More specifically, for example, charger 900A may be configured to sequentially transmit wireless power to each of first chargeable device 902 and second chargeable device 903. Further, charger 900A may be configured to request and receive a signal from each of first chargeable device 902 and second chargeable device 903 identifying an amount of power received by each of first chargeable device 902 and second chargeable device 903. Thereafter, charger 900A may determine which chargeable device has a higher charging efficiency and, thereafter, convey power thereto. By way of example, charger 900A may determine that a charging efficiency with first chargeable device 902 is greater than a charging efficiency with second chargeable device 903 and, therefore, charger 900A may select first chargeable device 902 and convey power thereto.

As another example, charger 900A may be configured to charge a device having the greatest need for a charge. More specifically, for example, charger 900A may be configured to determine, via communication means, a charging level of each of first chargeable device 902 and second chargeable device 903 and, thereafter, select and convey wireless power to the device that has the least charged battery. By way of example, charger 900A may determine that a battery of second chargeable device 903 has a lower charging level than a battery of first chargeable device 902 and, as a result, charger 900A may select and convey wireless power to second chargeable device 903. Furthermore, after a charging level of the battery of second chargeable device 903 has reached an acceptable status, charger 900A may convey wireless power to first chargeable device 902. Further, according to another exemplary embodiment, charger 900A may be configured to determine whether a time domain multiplexing method, based upon allocated activation time slots for each of first chargeable device 902 and second chargeable device 903, may enable for an optimal charging solution.

Figure 16:
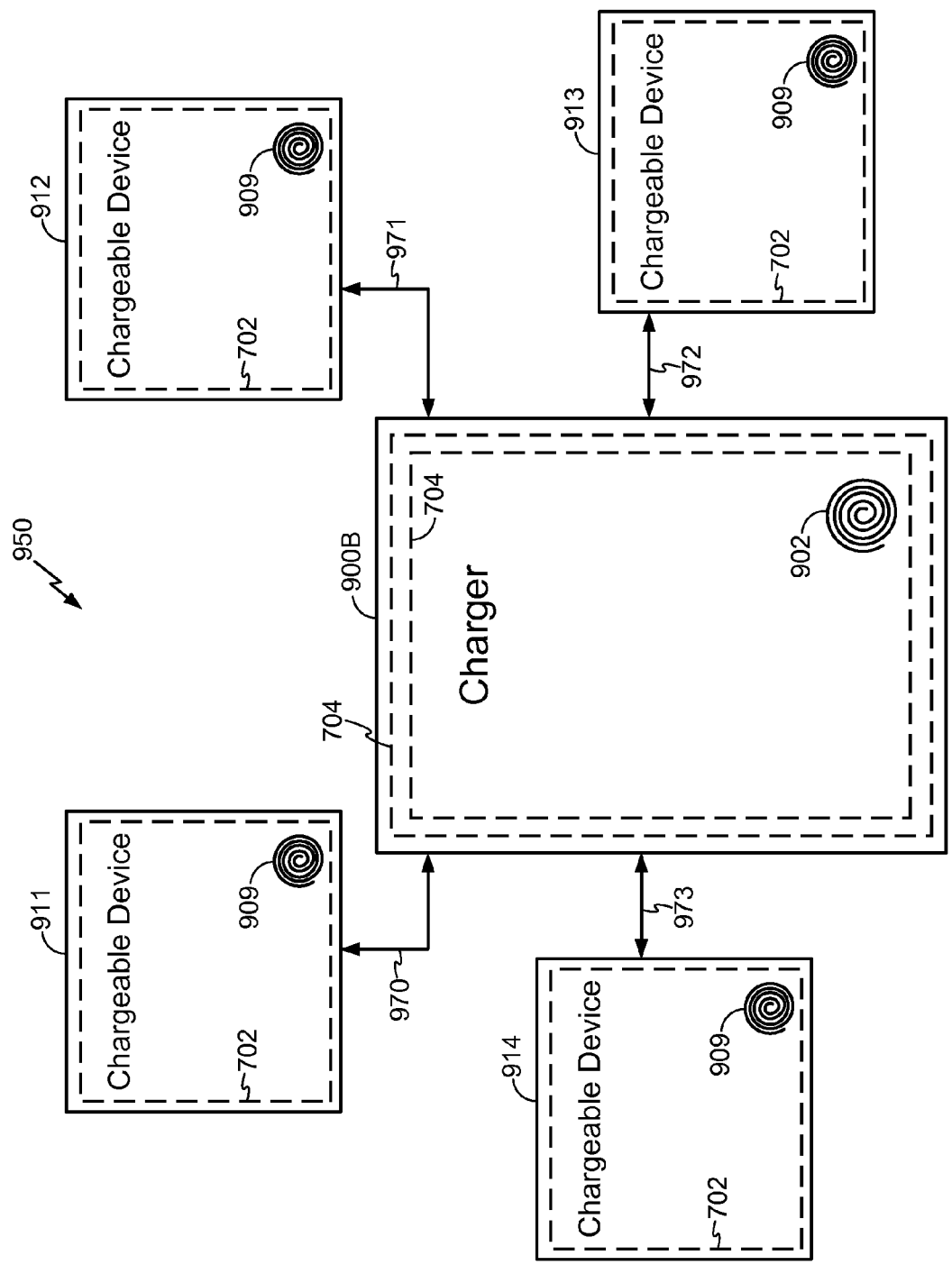
FIG. 16 illustrates another system including a wireless charger and a plurality of chargeable devices, in accordance with an exemplary embodiment of the present invention.

FIG. 16 illustrates a system 950 including charger 900B, a first chargeable device 911, a second chargeable device 912, a third chargeable device 913, and a forth chargeable device 914. As illustrated, each of first chargeable device 911, second chargeable device 912, third chargeable device 913, and forth chargeable device 914 include an antenna 702 configured to receive wireless power transmitted at a specific frequency via near-filed resonance. Furthermore, each of first chargeable device 911, second chargeable device 912, third chargeable device 913, and forth chargeable device 914 include a coil 909 configured to receive wireless power via inductive coupling. It is noted that charger 900B is similar to charger 900 of FIG. 13 and, therefore, will not be described in detail. However, it is noted that charger 900B includes two transmit antennas 704. According to one contemplated operation of system 950, charger 900B may detect each of first chargeable device 911, second chargeable device 912, third chargeable device 913, and forth chargeable device 914 via any suitable means. According to one contemplated operation of system 950, charger 900B may detect each of first chargeable device 911, second chargeable device 912, third chargeable device 913, and forth chargeable device 914, each of which being positioned within an associated charging region and operating with one or more wireless power protocols (e.g., near-field resonance) and/or resonating at one or more wireless power frequencies (e.g., unlicensed ISM bands).

Moreover, upon detection thereof, respective communication links 970, 971, 972, and 973 may be established between charger 900 and each of first chargeable device 911, second chargeable device 912, third chargeable device 913, and a forth chargeable device 914. Furthermore, upon detection of first chargeable device 911, second chargeable device 912, third chargeable device 913, and forth chargeable device 914, charger 900B may determine an optimal charging solution for system 950.

It is noted that charger 900B may simultaneously transmit power to a number of receive antennas (i.e., receive antenna 702) equal to a number of transmit antennas (i.e., transmit antennas 704). For example, in the embodiment illustrated in FIG. 15, charger 900B may be configured to simultaneously transmit wireless power to two transmit antennas 704. Furthermore, it is noted that coil 902 may simultaneously transmit wireless power to multiple coils 909, so long as the coils 909 are in phase with coil 902

According to one exemplary embodiment, charger 900B may be configured to determine which one or more detected chargeable devices should be charged to enable for an optimal charging solution. As one example, charger 900B may be configured to determine a charging efficiency between charger 900B and each of first chargeable device 911, second chargeable device 912, third chargeable device 913, and forth chargeable device 914. Thereafter, to reduce power loss, charger 900B may be configured to convey wireless power to one or more chargeable devices that have the highest charging efficiency. More specifically, for example, charger 900B may be configured to sequentially transmit wireless power to each of first chargeable device 911, second chargeable device 912, third chargeable device 913, and forth chargeable device 914 according to various protocols and frequencies. Further, charger 900B may be configured to request and receive a signal from each of first chargeable device 911, second chargeable device 912, third chargeable device 913, and forth chargeable device 914 identifying an amount of power received by each of first chargeable device 911, second chargeable device 912, third chargeable device 913, and forth chargeable device 914 according to each suitable protocol and frequency. Thereafter, charger 900B may determine which one or more chargeable devices should be charged with which protocols and frequencies to enable for an optimal charging scenario of system 950.

As another example, charger 900B may be configured to convey power to one or more chargeable devices that have the greatest need for a charge. More specifically, for example, charger 900B may be configured to determine, via communication means, a charging level of each of first chargeable device 911, second chargeable device 912, third chargeable device 913, and forth chargeable device 914 and, thereafter, convey wireless power to the one or more chargeable devices having the least charged batteries. Further, according to another exemplary embodiment, charger 900B may be configured to determine whether a time domain multiplexing method, based upon allocated activation time slots for two or more of first chargeable device 911, second chargeable device 912, third chargeable device 913, and forth chargeable device 914, may enable for an optimal charging solution.

It is noted that charger 900 and, more specifically, at least one antenna 704 of charger 900 may include additional functionality. As one example, antenna 704 may be configured to transmit radio frequencies. Furthermore, for example, antenna 704 may be configured to operate as a RF repeater, a femtocell, a WiFi access point (AP), or any combination thereof. Additionally, antenna 704 may positioned remotely from and connected to charger 900 via a coax, an RF conductor, an IP connection, or any other suitable connector. In this example, antenna 704 may configured to operate as a remote antenna for an RF repeater, a femtocell, a WiFi access point (AP), or any combination thereof.

Figure 17:
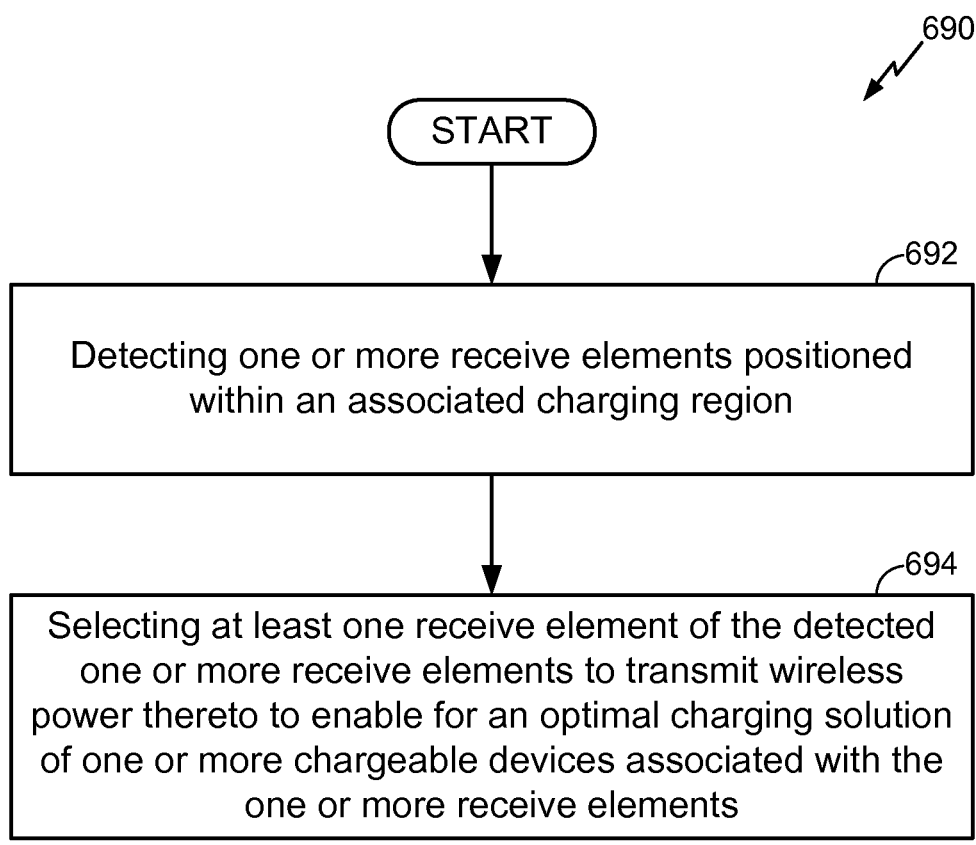
FIG. 17 is a flowchart illustrating another method, according to an exemplary embodiment of the present invention.

FIG. 17 is a flowchart illustrating a method 690, in accordance with one or more exemplary embodiments. Method 690 may include detecting one or more receive elements positioned within an associated charging region (depicted by numeral 692). Method 690 may further include selecting at least one receive element of the detected one or more receive elements to transmit wireless power thereto to enable for an optimal charging solution of one or more chargeable devices associated with the one or more receive elements (depicted by numeral 694).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A chargeable device, comprising:
   at least one receive element configured to receive wireless power; and
   a receive circuit configured to:
   detect a plurality of wireless chargers according to one or more protocols, or one or more frequencies, or both, a first charger of the detected plurality of wireless chargers associated with a protocol or frequency different than a corresponding protocol or frequency for a second charger of the detected plurality of wireless chargers,
   receive an amount of power from at least the first and second chargers of the detected plurality of wireless chargers,
   determine the amount of power received from the first and second chargers,
   select one of the first charger or the second charger from which to receive the wireless power based on (a) the associated protocol or frequency and (b) the amount of power received, and
   receive the wireless power to charge or power a load.

2. The chargeable device of claim 1, the receive circuit further configured to detect the plurality of wireless chargers by sampling for wireless chargers operating with at least one of the one or more protocols.

3. The chargeable device of claim 2, the receive circuit further configured to detect the plurality of wireless chargers by sampling for wireless chargers operating with a near-field resonance protocol, or an inductive coupling protocol, or both.

4. The chargeable device of claim 1, the receive circuit further configured to detect the plurality of wireless chargers by sampling for wireless chargers resonating at the one or more frequencies.

5. The chargeable device of claim 4, the receive circuit further configured to detect the plurality of wireless chargers by sampling for wireless chargers resonating at one or more unlicensed ISM band frequencies.

6. The chargeable device of claim 1, further comprising:
   a processor configured to determine which one of the plurality of chargers provides most efficient transfer of wireless power to the load based on a position of the first and second chargers relative to the load; and
   a location device configured for determining a location thereof.

7. The chargeable device of claim 1, the at least one receive element comprising at least one of a receive antenna and a coil.

8. The chargeable device of claim 1, the receive circuit further configured to wirelessly communicate with at least one charger of the detected plurality of wireless chargers.

9. The chargeable device of claim 1, the receive circuit further configured to control at least one operation of at least one charger of the detected plurality of wireless chargers.

10. A method of operating a: chargeable device, comprising:
    detecting a plurality of wireless chargers according to one or more protocols, or one or more specific frequencies, or both, a first charger of the detected plurality of wireless chargers associated with a protocol or frequency different than a corresponding protocol or frequency for a second charger of the detected plurality of wireless chargers;
    receiving an amount of power from at least the first and second chargers of the detected plurality of wireless chargers;
    determining the amount of power received from the first and second chargers; and
    selecting one of the first charger or the second charger from which to receive the wireless power based on (a) the associated protocol or frequency and (b) the amount of power received to enable charging of the chargeable device.

11. The method of claim 10, wherein detecting the plurality of wireless chargers comprises detecting a plurality of wireless chargers according to a near-field resonance protocol, or an inductive coupling protocol, or both.

12. The method of claim 10, wherein the plurality of wireless chargers comprises detecting a plurality of wireless chargers resonating at least one unlicensed ISM band frequency.

13. The method of claim 10, wherein selecting comprises:
    sequentially receiving wireless power from each charger of the detected plurality of wireless chargers sufficient to power or charge the chargeable device.

14. The method of claim 10, wherein selecting comprises selecting chargers from among the detected plurality of wireless chargers to receive wireless power therefrom in a time-domain multiplexing method.

15. The method of claim 10, further comprising detecting a version of one or more chargers of the detected plurality of wireless chargers.

16. A chargeable device, comprising:
    means for detecting a plurality of wireless chargers according to one or more protocols, or one or more frequencies, or both, a first charger of the detected plurality of wireless chargers associated with a protocol or frequency different than a corresponding protocol or frequency for a second charger of the detected plurality of wireless chargers;
    means for receiving an amount of power from at least the first and second chargers of the detected plurality of wireless chargers;
    means for determining the amount of power received from the first and second chargers; and
    means for selecting one of the first charger or the second charger from which to receive the wireless power based (a) on the associated protocol or frequency and (b) the amount of power received to enable charging of the chargeable device.

17. A charger for transmitting wireless power, comprising:
    at least one transmit element configured to wirelessly transmit the wireless power; and
    a transmit circuit configured to:
        detect a plurality of chargeable devices positioned within an associated charging region according to one or more protocols, or one or more frequencies, or both, a first chargeable device of the detected chargeable devices associated with a protocol or frequency different than a corresponding protocol or frequency for a second chargeable device of the detected chargeable devices,
        transmit an amount of power to at least the first and second chargeable devices of the detected plurality of chargeable devices,
        determine the amount of power received by the first and second chargeable devices,
        select one of the first chargeable device or the second chargeable device to transmit the wireless power to based on (a) the associated protocol or frequency, and (b) the amount of power received, and
        transmit the wireless power to at least one of the detected chargeable devices.

18. The charger of claim 17, the transmit circuit further configured to detect the plurality of chargeable devices by sampling for chargeable devices operating with at least one of the one or more protocols.

19. The charger of claim 18, the transmit circuit further configured to detect the plurality of chargeable devices by sampling for chargeable devices operating with a near-field resonance protocol, or an inductive coupling protocol, or both.

20. The charger of claim 17, the transmit circuit further configured to detect the plurality of chargeable devices by sampling for chargeable devices resonating at least one of the one or more frequencies.

21. The charger of claim 17, the transmit circuit further configured to detect the plurality of chargeable devices by sampling for chargeable devices resonating at least one unlicensed ISM band.

22. The Charger of claim 17, further comprising a location device configured for determining a location thereof.

23. The charger of claim 17, the at least one transmit element comprising at least one of a transmit antenna and a coil.

24. A method of operating a wireless charger, comprising:
    detecting a plurality of chargeable devices positioned within an associated charging region according to one or more protocols, or one or more frequencies, or both, a first chargeable device of the detected chargeable devices associated with a protocol or frequency different than a corresponding protocol or frequency for a second chargeable device of the detected chargeable devices;
    transmitting an amount of power to at least the first and second chargeable devices of the detected plurality of chargeable devices;
    determining the amount of power received by the first and second chargeable devices; and
    selecting one of the first chargeable device or the second chargeable device to transmit the wireless power to based on (a) the associated protocol or frequency and (b) the amount of power received to enable a charging solution of at least one of the detected chargeable devices.

25. The method of claim 24, wherein detecting the plurality of chargeable devices comprises detecting the plurality of chargeable devices according to a near-filed resonance protocol, or an inductive coupling protocol, or both.

26. The method of claim 24, wherein detecting the plurality of chargeable devices comprises detecting one or more receive elements resonating at least one unlicensed ISM band frequency.

27. The method of claim 24, wherein selecting comprises selecting at least one chargeable devices of the detected plurality of chargeable devices to transmit wireless power thereto in a time-domain multiplexing method.

28. The method of claim 24, further comprising detecting a version of at least one of the chargeable devices.

29. The method of claim 24, wherein selecting comprises selecting the at least one chargeable device of the detected plurality of chargeable devices having a highest charging efficiency with the wireless charger from among the detected plurality of chargeable devices.

30. The method of claim 24, wherein selecting comprises selecting the at least one chargeable device having a lowest charging level from among the detected plurality of chargeable devices.

31. The method of claim 24, further comprising receiving a signal indicative of an amount of power received at each chargeable device.

32. A wireless charger, comprising:
   means for detecting a plurality of chargeable devices positioned within an associated charging region according to one or more protocols, or one or more frequencies, or both, a first chargeable device of the detected chargeable devices associated with a protocol or frequency different than a corresponding protocol or frequency for a second chargeable device of the detected chargeable devices;
   means for transmitting an amount of power to at least the first and second chargeable devices of the detected plurality of chargeable devices;
   means for determining the amount of power received by the first and second chargeable devices; and
   means for selecting one of the first chargeable device or the second chargeable device to transmit the wireless power to based on (a) the associated protocol or frequency and (b) the amount of power received to enable a charging solution of at least one of the detected chargeable devices.

\* \* \* \* \*